United States Patent
Crawford

(10) Patent No.: US 6,225,984 B1
(45) Date of Patent: *May 1, 2001

(54) REMOTE COMPUTER INTERFACE

(75) Inventor: Bernard John Crawford, Los Altos, CA (US)

(73) Assignee: Hitachi Micro Systems, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,868

(22) Filed: May 1, 1998

(51) Int. Cl.$^7$ .................................................. G09G 5/00
(52) U.S. Cl. ............................ 345/173; 345/173; 348/13
(58) Field of Search .................................. 345/153, 169, 345/173, 335, 158, 966, 968, 1, 2, 3; 178/4.1 R, 18.03; 348/13, 14, 15, 17

(56) References Cited

U.S. PATENT DOCUMENTS

| | | | |
|---|---|---|---|
| 5,519,433 | * 5/1996 | Lappington et al. | 348/2 |
| 5,831,664 | * 11/1998 | Wharton et al. | 345/156 |
| 5,859,662 | * 1/1999 | Cragun et al. | 345/13 |
| 5,867,166 | * 2/1999 | Myhrvold et al. | 345/419 |
| 5,884,323 | * 3/1999 | Hawkins et al. | 707/201 |
| 5,949,441 | * 2/1999 | Ristau | 345/202 |

* cited by examiner

Primary Examiner—Vijay Shankar
Assistant Examiner—Mansour M. Said
(74) Attorney, Agent, or Firm—Squire, Sanders & Dempsey L.L.P.

(57) ABSTRACT

A remote user interface system for use with a host computer is provided. The remote user interface system includes a host transceiver system attached for communication with a host computer system. The remote user interface system also includes a portable interface tablet having a touchscreen display. Functionally, the host transceiver system gathers audio and video output generated by the host computer system. The audio and video output are sent by the host transceiver system to the portable interface tablet for output to the user. The portable interface tablet also gathers mouse and audio input from the user. These inputs are sent by the portable interface tablet to the host transceiver system and injected into the host computer system as user input.

12 Claims, 1 Drawing Sheet

REMOTE COMPUTER INTERFACE

FIELD OF THE INVENTION

The present invention relates generally to user interface systems for computers and other data processing systems. More specifically, the present invention includes a remote touch-screen for viewing and interacting with a personal computer or other computer system.

BACKGROUND OF THE INVENTION

Computers and other data processing systems often include some form of user interface system. These interface systems may be quite simple, as in the case of a data entry system equipped with a simple display and keyboard combination. Interface systems may also be highly complex, as in the case of a multimedia system equipped with a high-resolution graphics display, keyboard, pointing device and stereo sound capability. Still other systems, such as computers used to provide virtual reality environments, may have even more highly complex user interface systems.

The purpose behind a computer's user interface systems is to provide the user with a mechanism for interacting with the computer. Unfortunately, due to the nature of most user interface systems, this interaction must occur in the proximity of the computer system. In other words, most user interface systems assume that the user will literally sit facing the computer screen. This assumption limits the ways in which computer systems may be effectively used.

For example, consider the case where employees need to access inventory information as they move through a warehouse Typically, this information is stored on a computer system. In most cases, the information stored within the computer system can only be accessed at a terminal or workstation. The result is that employees may have to carry paper printouts and that updates to the inventory information may be inconvenient.

As another illustration, consider the familiar example of a corporate meeting. During these meetings, a number of employees typically gather in a single meeting room. Over the course of the meeting, it may become apparent that necessary documents exist on a computer assigned to a particular employee. It is easy to appreciate the inconvenience that results if that employee then has to leave the meeting to retrieve the required document. Alternately, it may be imperative for a particular employee to monitor his or her electronic mail or other computer application. This becomes problematic if the employee is required to attend a meeting and cannot access his or her assigned workstation.

Thus, a need exists for a portable, mobile user interface system that allows computer systems to be accessed in a remote fashion.

SUMMARY OF THE INVENTION

The present invention includes a remote user interface system for use with a host computer. The remote user interface system is specifically intended to be used with a wide range of host computer types, including personal computers and workstations. The remote user interface system may also be used with other data processing equipment, such as point of sale terminals.

In general terms, a representative embodiment of the remote user interface system may be described as a combination of a host transceiver system and a portable interface tablet. The host transceiver system functions as a peripheral device that communicates with the host computer system. The communication between the host transceiver system and the host computer allows the host transceiver system to capture audio and video output generated by the host computer system. The communication between the host transceiver system and the host computer allows the host transceiver system to inject audio, keyboard and mouse input into the host computer system.

The portable interface tablet may include a flat panel display, implemented as a liquid crystal display (LCD) or other suitable technology. A pressure sensitive membrane, or other touchscreen device, may be positioned to overlay the flat panel display. An audio input device, such as one or more microphones, and an audio output device, such as one or more speakers, may also be included in the portable interface tablet.

The host transceiver system and the portable interface tablet are also configured to communicate with each other. This communication may be implemented using a range of techniques including both telephone and wireless modems. Alternatively, infra-red or other radio transmission techniques may be used.

In use, the host transceiver system captures audio and video output generated by the host computer system. This output is digitized and transmitted to the portable interface tablet. The portable interface tablet then reconstitutes the digitized output of the host computer system. The reconstituted output is used by the portable interface tablet to drive the flat panel display and audio output device of the portable interface tablet. In this way, audio and video output of the host computer system is captured, transmitted from the host computer system to the client subsystem, and presented to the user of the portable interface tablet. In effect, the user of the portable interface tablet hears and sees the same sounds and images that would be visible to a user sitting at the host computer system.

Input from the user is captured by the portable interface tablet. This input includes audio input and mouse commands generated by the user's interaction with the touchscreen. This input is digitized and transmitted to the host transceiver system. The host transceiver system then reconstitutes the digitized input. The reconstituted input is used by the host transceiver system to drive the audio input and mouse input of the host computer system. In this way, audio and mouse input is captured, transmitted from the portable interface tablet to the host transceiver system, and injected as input into the host computer system. In effect, the user of the portable interface tablet is able to interact with the host computer in a manner that is similar to the interaction of a user sitting at the host computer system.

The techniques used by the described embodiment may be extended to include additional input and output devices associated with the portable interface tablet. For example, the host transceiver system may be configured to inject keyboard input into the host computer system. The keyboard input may be generated using the touchscreen included in the portable interface tablet. Alternatively, the portable interface tablet may be configured to include a membrane or other keyboard. Other devices, such as floppy drives, may also be accommodated by appropriate extension to the host transceiver system and portable interface tablet.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Overview

Figure 1:
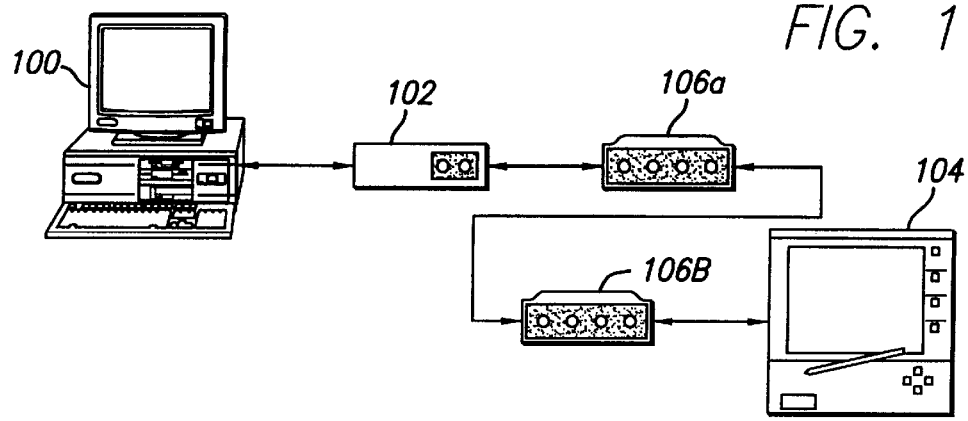
FIG. 1 is a block diagram showing the components of a preferred embodiment of the present invention.

The present invention includes a remote user interface system for use with a host computer. In FIG. 1, a representative host computer is shown and designated 100. Host computer 100 may be selected from a wide range of computer types, including personal computers and workstations. Even more generally, host computer 100 may be selected from a range of computer-like data processing equipment, such as point of sale terminals. As shown in FIG. 1, a representative embodiment of the remote user interface system may be described as a combination of a host transceiver system 102 and a portable interface tablet 104. Host transceiver system 102 is shown as an external peripheral device to host computer 100. It should be appreciated that host transceiver system 102 may be also be implemented as an internal peripheral device, such as an ISA or PCI card.

Host transceiver 102 is connected to host computer 100 for communication with host computer 100. The communication between host transceiver system 102 and host computer 100 allows host transceiver system 102 to capture output, such audio and video output, generated by host computer system 100. The communication between host transceiver system 102 and host computer 100 allows host transceiver system 102 to inject input, such as audio or mouse input, into host computer system 100.

Host transceiver system 102 is also shown to be connected to portable interface tablet 104. Specifically, in FIG. 1, this connection is shown to be implemented using a matched pair of telephonic modems 106a and 106b. It should be appreciated, however, that the connection between host transceiver system 102 and portable interface tablet 104 may be implemented using a wide range of different communication technologies. These technologies include, for example, wireless and cellular modems, serial and parallel communication lines as well as ether and other network types.

In general terms, the communication between host transceiver system 102 and portable interface tablet 104 allows portable interface tablet 104 to function as a remote user interface system for host computer 100. For this remote user interface, host transceiver system 102 captures video and audio output from host computer 100. This output is transmitted to portable interface tablet 104 for presentation to a user. At the same time, user input is captured by portable interface tablet 104. This input is transmitted to host transceiver system 102 and injected into host computer 100. A more detailed description of the present invention is provided in the following paragraphs.

Host Transceiver System

Figure 2:
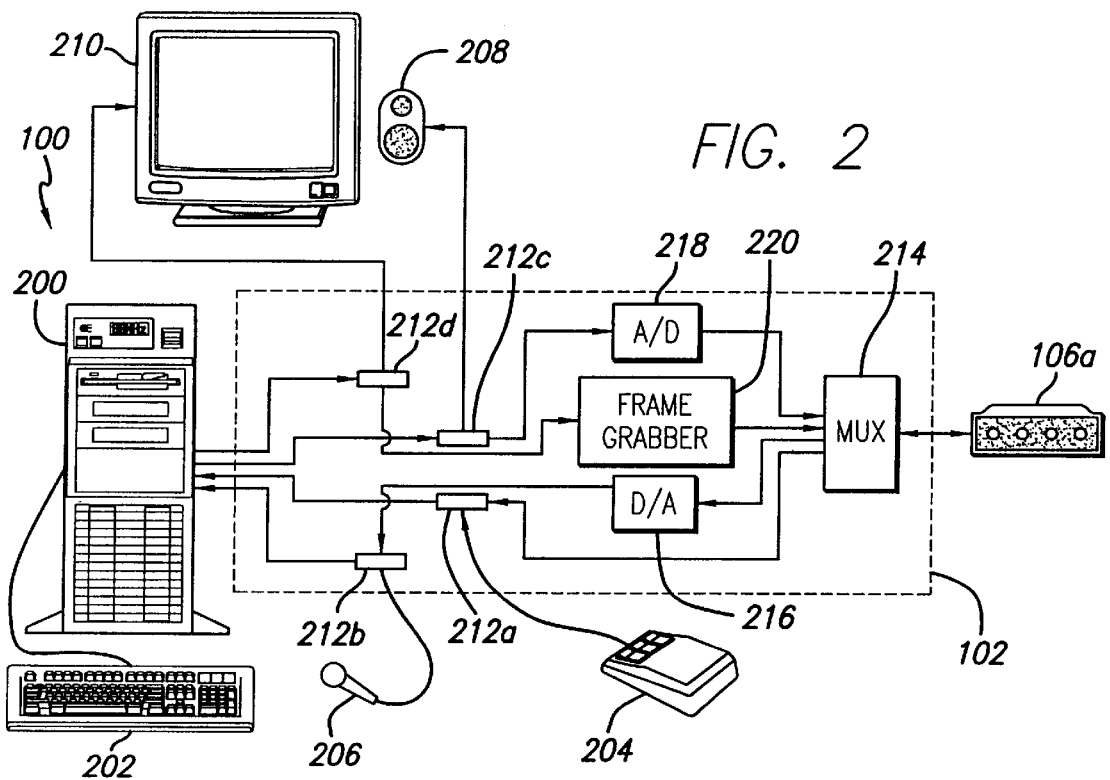
FIG. 2 is a block diagram of a host transceiver system as used in a preferred embodiment of the present invention.

Host transceiver system 102 may be better understood by reference to FIG. 2. In FIG. 2, a representative embodiment of host computer 100 is shown to include a CPU tower 200, a keyboard 202, a mouse 204, a microphone 206, a loudspeaker 208 and a monitor 210. It should be clear that this selection of components is representative in nature. Thus, host computer 100 may include more, or fewer components. Keyboard 202, mouse 204 and microphone 206 function as input devices that allow host computer 100 to gather input from a user. Loudspeaker 208 and monitor 210, on the other hand, function as output devices that allow host computer 100 to present output to a user. Effectively, this combination of input devices and output devices functions as a user interface system for a user sitting at host computer 100.

As shown in FIG. 2, mouse 204 is connected to a first input to a tee connector 212a within host transceiver system 102. Modem 106a is connected via a multiplexer 214 as a second input of a tee connector 212a. The output of tee connector 212a is connected to CPU tower 200 of host computer system 100. The interconnections between mouse 204, tee connector 212a, multiplexer 214 and modem 106a allows host computer 100 to gather mouse input from two distinct sources. The first of these sources is mouse 204. The second source is modem 106a. In this way, mouse input commands that are transmitted to modem 106a function as mouse input to host computer 100.

In a similar fashion, microphone 206 is connected to a first input of a tee connector 212b within host transceiver system 102. Modem 106a is connected via a multiplexer 214 and a digital to analog converter 216 as a second input to tee connector 212b. The output of tee connector 212b is connected to CPU tower 200 of host computer system 100. The interconnections between microphone 206, tee connector 212b, multiplexer 214 and modem 106a allows host computer 100 to gather audio input from two distinct sources. The first of these sources is microphone 206. The second source is modem 106a. In this way, audio input transmitted to modem 106a functions as audio input to host computer 100. Unlike audio input received from microphone 206, audio input received from modem 106a is in a digitized form. For this reason, digital to analog converter 216 is positioned between modem 106a and tee connector 212b. Digital to analog converter 216 converts the digitized audio input received by modem 106a into an analog signal of a form similar to the output of microphone 206.

Loudspeaker 208 is connected to a first output of a tee connector 212c within host transceiver system 102. The second output of tee connector 212c is connected to the input of analog to digital converter 218. The output of analog to digital converter 218 is connected, via multiplexer 214 to modem 106a. The input of tee connector 212c is connected to CPU tower 200 of host computer 100. The interconnections between loudspeaker 208, tee connector 212c, analog to digital converter 218, multiplexer 214 and modem 106a allows host computer 100 to send audio output to two distinct output devices. The first of these output devices is loudspeaker 208. The second output device is modem 106a. Unlike audio output sent to loudspeaker 208, audio output sent to modem 106a must be sent in a digitized form. For this reason, analog to digital converter 218 is positioned between modem 106a and tee connector 212c. Analog to digital converter 218 converts the audio output of host computer 100 into a digitized form suitable for transmission by modem 106a.

Monitor 210 is connected to a first output of a tee connector 212d within host transceiver system 102. The second output of tee connector 212*d* is connected to the input of a frame grabber 220 within host transceiver system 102. The output of frame grabber 220 is connected, via multiplexer 214, to modem 106*a*. The input of tee connector 212*d* is connected to CPU tower 200 of host computer 100. The interconnections between monitor 210, tee connector 212*d*, frame grabber 220, multiplexer 214 and modem 106*a* allows host computer 100 to send video output to two distinct output devices. The first of these output devices is monitor 210. The second output device is modem 106*a*.

Unlike video output sent to monitor 210, video output sent to modem 106*a* must be sent in a digitized form. For this reason frame grabber 220 is positioned between modem 106*a* and tee connector 212*d*. Frame grabber 220 captures the video output of host computer 100 on a frame-by-frame basis. Each frame corresponds to the entire video image displayed on monitor 210. Frames are produced by host computer 100 and captured by frame grabber 220 at a pre-determined refresh rate, such as sixty frames per-second. After each frame is captured, frame grabber 220 converts the frame into a digitized video form suitable for transmission by modem 106*a*. The digitized frame is then sent to modem 106*a*.

The embodiment of host transceiver system 102 shown in FIG. 2 is adaptable to numerous embodiments. In particular, host transceiver system 102 may be extended to include additional input devices or output devices. Thus, as discussed, keyboard 202 functions as an input device for host computer 100. It may be appreciated that host transceiver system 102 may be extended to allow modem 106*a* to function as an alternative keyboard input device (in much the same way that modem 106*a* functions as an alternative mouse input device). In fact, host transceiver system 102 may be extended to accommodate nearly any input, output or combined input output devices, such as floppy disk drives and printers.

The embodiment of host transceiver system 102 shown in FIG. 2 is also adaptable to numerous embodiments of host computer 100. For example, it is becoming increasingly common for computer systems to provide inputs and outputs for digital audio and video. In these cases, it may not be necessary to include digital to analog converter 216, or analog to digital converters 218 and 220. For performance reasons, it may also be desirable to multiplex the various outputs of host transceiver system 102 onto more than one channel. In these cases, multiplexer 214 may be replaced with a series of multiplexers, each connected to a respective communications device, such as modem 106*a*.

The embodiment of host transceiver system 102 shown in FIG. 2 works in combination with the physical input and output devices provided by host computer system 100. Thus, host transceiver system 102 includes tee connectors 212 for capturing input and output intended for keyboard 202, mouse 204, microphone 206, loudspeaker 208 and monitor 210. As an alternative, host transceiver system 102 may be implemented as a virtual device that is not physically coupled to the physical input and output devices provided by host computer system 100. This arrangement is particularly advantageous in the context where host computer system 100 is a multi-user computer system capable of simultaneously supporting a series of host transceiver systems 102 and a series of portable interface tables 104.

Portable Interface Tablet

Figure 3:
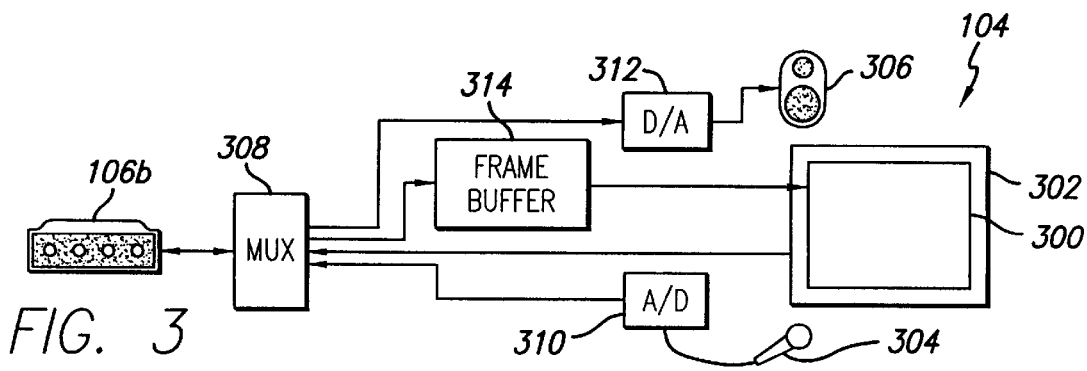
FIG. 3 is a block diagram of a portable interface tablet as used in a preferred embodiment of the present invention.

Portable interface tablet 104 may be better understood by reference to FIG. 3. In FIG. 3, a representative embodiment of portable interface tablet 104 is shown to include a flat panel display 300. Flat panel display 300 may be a liquid crystal display (LCD) or any other suitable display technology. A touchscreen 302 overlays flat panel display 300. Touchscreen 302 may be selected from a wide range of suitable types. For example, touchscreen 302 may be a pressure sensitive membrane. Alternatively, touchscreen 302 may use infrared or optical techniques to determine the position of a user's hand or any type of pointing stylus. In still other cases, it will be more appropriate to replace touchscreen 302 with an alternative pointing device, such as a trackball or electrostatic pointing tablet.

Portable interface tablet 104 also includes a microphone 304 and a loudspeaker 306. Effectively, the combination of the flat panel display 300, touchscreen 302, microphone 304 and loudspeaker 306 function as a user interface system for a user of portable interface tablet 104.

Touchscreen 302 is connected to a multiplexer 308 included within portable interface tablet 104. Multiplexer 308 is connected, in turn, to modem 106*b*. The interconnections between touchscreen 302, multiplexer 308 and modem 106*b* allows touchscreen 302 to transmit mouse commands using modem 106*b*.

Microphone 304 is connected to an analog to digital converter 310 included within portable interface tablet 104. Analog to digital converter 310 is connected via multiplexer 308 to modem 106*b*. The interconnections between microphone 304, analog to digital converter 310, multiplexer 308 and modem 106*b* allows microphone 304 to transmit audio output, digitized by analog to digital converter 310 using modem 106*b*.

Loudspeaker 306 is connected to an output of a digital to analog converter 312 included within portable interface tablet 104. Digital to analog converter 312 is connected as an output of multiplexer 308. Multiplexer 308 is an output of modem 106*b*. The interconnections between loudspeaker 306, digital to analog convert er 312, multiplexer 308 and modem 106*b* allows portable interface tablet 104 to receive and reproduce received digitized audio input using modem 106*b*.

Flat panel display 300 is connected to an output of a frame buffer 314 included within portable interface tablet 104. Frame buffer 314 is connected as an output of multiplexer 308. Multiplexer 308 is an output of modem 106*b*. Digitized video input received by modem 106*b* is sent by multiplexer 308 to frame buffer 314. Frame buffer 314 collects this digitized video which is then sent to flat panel display 300 for output. Effectively, the interconnections between flat panel display 300, frame buffer 314, multiplexer 308 and modem 106*b* allows portable interface tablet 104 to receive and reproduce digitized video input from a digital modem 106*b*. The preceding description assumes that flat panel display 300 is an analog device. In cases where flat panel display 300 accepts analog input, it is possible to convert frame buffer 314 to analog output and to transfer to flat panel display 300.

PC Remote View

Host transceiver system 102 and portable interface tablet 104 cooperate to allow the latter to function as a remote user interface system for host computer 100. As part of this user interface system, host computer 100 uses portable interface tablet 104 as an audio output device. More specifically, during operation, host computer 100 will typically generate audio output. For the embodiment of FIGS. 2 and 3, this audio output is converted to a digital audio format by analog to digital converter 218 of host transceiver system 102. The digitized audio output passes through multiplexer 214 of host transceiver system 102 and into modem 106*a*. Modem 106*a* transmits the digitized audio output to modem 106*b*.

Modem 106b passes the digitized audio output to multiplexer 308 of portable interface tablet 104. Multiplexer 308 sends the digitized audio output to digital to analog converter 312 of portable interface tablet 104. Digital to analog converter 312 reconstitutes the digitized audio output into an analog audio signal. The audio output of analog converter 312 is sent to loudspeaker 306 where it is output for the user of portable interface tablet 104. In this way, audio output generated by host computer 100 is presented to the user of portable interface tablet 104.

In a similar fashion, the present invention allows host computer 100 to use portable interface tablet 104 as a video output device. More specifically, during operation, host computer 100 will typically generate video output. For the embodiment of FIGS. 2 and 3, this video output is converted to a digital video format by frame grabber 220 of host transceiver system 102. The digitized video output of frame grabber 220 then passes through multiplexer 214 of host transceiver system 102 and into modem 106a. Modem 106a transmits the digitized video output to modem 106b. Modem 106b passes the digitized video output to multiplexer 308 of portable interface tablet 104. Multiplexer 308 sends the digitized video output to frame buffer 314. Frame buffer sends the digitized video output to a flat panel display 300. In this way, video output generated by host computer 100 is presented to the user of portable interface tablet 104.

The present invention also allows host computer 100 to use portable interface tablet 104 as an audio input device. More specifically, during use of portable interface tablet 104, the user may wish to provide audio input for host computer 100. For the embodiment of FIGS. 2 and 3, this audio input is gathered by microphone 304 of portable interface tablet 104 and passed to analog to digital converter 310. Analog to digital converter 310 converts the audio input into a digitized format suitable for transmission by modem 106b. The digitized audio input is then sent to modem 106b where it is transmitted to modem 106a and host transceiver system 102. Multiplexer 214 of host transceiver system 102 directs the digitized audio input to digital to analog converter 216. Digital to analog converter 216 reconstitutes the digitized audio input into an analog audio format. The analog audio input is then passed to tee connector 212b where it is injected into host computer 100. In this way, audio input captured by portable interface tablet 104 is input into host computer 100.

In a similar fashion, the present invention also allows host computer 100 to use portable interface tablet 104 as a mouse input device. More specifically, during use of portable interface tablet 104, the user may wish to provide mouse input for host computer 100. For the embodiment of FIGS. 2 and 3, this mouse input is gathered by touchscreen 302 of portable interface tablet 104. Touchscreen 302 passes the mouse input to multiplexer 308 and to modem 106b. Modem 106b transmits the mouse input to modem 106a and host transceiver system 102. Multiplexer 214 of host transceiver system 102 directs the mouse input to tee connector 212a where it is injected into host computer 100. In this way, mouse input captured by portable interface tablet 104 is input into host computer 100.

As shown in FIGS. 1 through 3, host transceiver system 102 and remote portable interface tablet 104 communicate using modems 106a and 106b. It should be appreciated that modems 106a and 106b are intended to represent a wide range of communications technologies. For example, modems 106a and 106b may be selected from traditional telephonic modems of various baud rates. Modems 106 may also be integrated service digital network (ISDN), asymmetric digital subscriber line (ADSL) or cellular modems. Modems 106 are also intended to represent various other networking technologies including local area network (LAN), wide area network (WAN) and wireless networking technologies.

Various methods exist for improving the rate of communication between host transceiver system 102 and remote portable interface tablet 104. For one of these methods, a first microcontroller is inserted between multiplexer 214 and modem 106a and a second microcontroller is inserted between multiplexor 308 and modem 106b. The first and second microcontrollers function to digitally compress output being sent to their respective modems 106. The microcontrollers also digitally decompress input received from their respective modems 106. In this way, data transferred between modems 106a and 106b is sent in a compressed format. This increases the rate of communication between host transceiver system 102 and remote portable interface tablet 104.

Another method for improving the rate of communication between host transceiver system 102 and remote portable interface tablet 104 requires the use of a video communications protocol where only changed video data is sent from host transceiver system 102 to remote portable interface tablet 104. For protocols of this type, successive frames of video information are not generally transmitted. Instead, data that describes the changes between successive frames is transmitted and used to reconstruct the video image. These protocols are especially effective when the image produced does not change rapidly.

It should also be noted that portable interface tablet 104 may provide a lower resolution image than monitor 210. This means that flat panel display 300 may provide viewer pixels than monitor 210. The pixels displayed by flat panel display 300 may also have a reduced color depth or be limited to gray-scale or monochrome output. In all of these cases, it is advantageous if transceiver system 102 performs appropriate filtering of video output prior to transmitting this video output between host transceiver system 102 and remote portable interface tablet 104.

The lightweight remote interface provided by the present invention provides an ideal environment for a range of novel applications. For example, the present invention provides a device for the remote presentation of audio and video multimedia displays. The present invention also provides an effective platform for inputting speech for conversion to text, including translation between differing languages. The present invention may also be used as a portable Internet browser or a remote tool for accessing any number of databases such as maps, guides and schedules. The present invention may also be equipped with a range of differing peripherals, such as light pens, or GPS (global position system) modules to enhance its ability to interact with systems located on host computer system 100.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A system comprising:
   a host computer system having at least one application program and a local host user interface;
   a host transceiver system, the host transceiver system including means for gathering output from the host computer system and means for injecting input into the host computer system;

a redundant user interface remotely coupled to the host computer system, the redundant user interface configured to be used in at least one remote location, the redundant user interface including means for producing output gathered by the host transceiver system from the host computer system, the redundant user interface also including means for gathering user input for injection by the host transceiver system into the host computer system; and a communications link capable of communicating to and from the at least one remote location configured to send output gathered by the host transceiver system to the redundant user interface, the communications link also configured to send input gathered by the redundant user interface to the host transceiver system, wherein a user can interactively interface with the at least one application program from either the local host user interface or the redundant user interface.

2. A system as recited in claim 1 wherein the means for gathering output from the host computer system includes means for gathering video output from the host computer system.

3. A system as recited in claim 1 wherein the means for gathering output from the host computer system includes means for gathering audio output from the host computer system.

4. A system as recited in claim 1 wherein the means for injecting input into the host computer system includes means for injecting audio input into the host computer system.

5. A system as recited in claim 1 wherein the means for injecting input into the host computer system includes means for injecting mouse input into the host computer system.

6. A system as recited in claim 1 wherein the means for producing output gathered by the host transceiver system includes a flat panel display.

7. A system as recited in claim 1 wherein the means for gathering user input includes a touch-screen.

8. A method for providing a remote redundant user interface for a host computer comprising:

gathering analog video and audio output from a host computer system, the host computer system having at least one application program and a local host user interface for interactively interfacing with the at least one application program;

digitizing the analog video and audio output to form digitized audio and video output;

processing the digitized audio and video output to form modified digitized audio and video output;

transmitting the modified digitized audio and video output to a portable interface tablet remotely coupled to the host computer system, the portable interface tablet allowing a user to interactively interface with the at least one application program;

receiving digitized audio and pointer input from the portable interface tablet;

converting the digitized audio input to form analog audio input; and injecting the analog audio and digitized pointer input into the host computer system.

9. The method of claim 8, wherein processing includes digital compression.

10. The method of claim 8, wherein processing includes filtering the video output.

11. A method for providing a remote redundant user interface for a host computer comprising the steps of:

gathering analog video and audio output from the host computer system;

digitizing the analog video and audio output to form digitized audio and video output;

processing the digitized audio and video output to form modified digitized audio and video output;

transmitting the modified digitized audio and video output to a portable interface tablet, the video output being transmitted using a video communications protocol where only changed video data is transmitted;

receiving digitized audio and pointer input from the portable interface tablet;

converting the digitized audio input to form analog audio input; and injecting the analog audio and digitized pointer input into the host computer system.

12. A method for providing a remote redundant user interface for a host computer comprising the steps of:

receiving digitized audio and video output from a host transceiver system;

converting the digitized audio output to form analog audio output;

outputting the analog audio output;

outputting the digitized video output using a video communications protocol where only changed video data is transmitted;

gathering analog audio and pointer input;

digitizing the analog audio and pointer input to form digitized audio and pointer input;

processing the digitized audio and pointer input to form modified digitized audio and pointer input; and transmitting the modified digitized audio and pointer input to the host transceiver system.

* * * * *